US010822504B2

(12) United States Patent
Zheng

(10) Patent No.: US 10,822,504 B2
(45) Date of Patent: Nov. 3, 2020

(54) SELF-HEALING TRANSPARENT POLYMER COMPOSITIONS CONTAINING CONDUCTIVE COLLOIDS

(71) Applicant: ESSILOR INTERNATIONAL (COMPAGNIE GÉNÉRALE D'OPTIQUE), Charenton-le-Pont (FR)

(72) Inventor: Haipeng Zheng, Dallas, TX (US)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 525 days.

(21) Appl. No.: 14/915,840

(22) PCT Filed: Sep. 3, 2013

(86) PCT No.: PCT/IB2013/002624
§ 371 (c)(1),
(2) Date: Mar. 1, 2016

(87) PCT Pub. No.: WO2015/033182
PCT Pub. Date: Mar. 12, 2015

(65) Prior Publication Data
US 2016/0195643 A1 Jul. 7, 2016

(51) Int. Cl.
*C09D 7/61* (2018.01)
*C08G 75/12* (2016.01)
*C08G 75/04* (2016.01)
*G02B 1/04* (2006.01)
*G02B 1/10* (2015.01)
*C09D 4/00* (2006.01)
*G02B 1/14* (2015.01)
*C09D 5/00* (2006.01)
*C09D 181/02* (2006.01)
*G02C 7/02* (2006.01)
*C08G 18/83* (2006.01)
*C08K 3/22* (2006.01)

(52) U.S. Cl.
CPC ............. *C09D 7/61* (2018.01); *C08G 75/04* (2013.01); *C08G 75/12* (2013.01); *C09D 4/00* (2013.01); *C09D 5/00* (2013.01); *C09D 181/02* (2013.01); *G02B 1/041* (2013.01); *G02B 1/105* (2013.01); *G02B 1/14* (2015.01); *G02C 7/02* (2013.01); *C08G 18/835* (2013.01); *C08K 3/22* (2013.01); *C08K 3/2279* (2013.01); *G02C 2202/16* (2013.01)

(58) Field of Classification Search
CPC .... C08G 75/045; C08G 75/12; C08G 18/835; C09D 181/02; C09D 4/00; C09D 5/00; C09D 7/61; G02B 1/041; G02B 1/105; G02B 1/14; G02C 7/02; G02C 2202/16; C08K 3/22; C08K 3/2279
See application file for complete search history.

(56) References Cited

U.S. PATENT DOCUMENTS

| 5,876,805 A * | 3/1999 | Ostlie | C08G 75/045 427/514 |
|---|---|---|---|
| 6,551,710 B1 * | 4/2003 | Chen | C09D 4/00 428/412 |
| 7,872,078 B2 | 1/2011 | Foringer et al. | 525/440.01 |
| 2009/0062453 A1 | 3/2009 | Foringer et al. | 524/500 |
| 2009/0098299 A1 * | 4/2009 | Cheng | C08J 7/16 427/384 |
| 2009/0318581 A1 * | 12/2009 | Ota | G02B 5/23 522/148 |
| 2011/0003159 A1 * | 1/2011 | Mather | B32B 27/20 428/425.6 |
| 2011/0034585 A1 | 2/2011 | Christmann et al. | 523/209 |
| 2014/0036223 A1 * | 2/2014 | Zheng | B82Y 20/00 351/159.01 |
| 2014/0070149 A1 * | 3/2014 | Valeri | C08K 3/22 252/519.33 |
| 2014/0092360 A1 * | 4/2014 | Zheng | G02B 1/105 351/159.57 |

FOREIGN PATENT DOCUMENTS

| WO | WO2006/055409 | 5/2006 | |
| WO | WO-2006055409 A2 * | 5/2006 | ............... C09D 4/00 |
| WO | WO 2009/029641 | 3/2009 | |
| WO | WO 2012/105974 | 8/2012 | |

(Continued)

OTHER PUBLICATIONS

Triallyl isocyanurate PubChem (2019).*
Pentaerythritol tetrakis(3-mercaptopropionate) PubChem (2019).*
International Search Report and Written Opinion issued in PCT/IB2013/002624, dated Mar. 18, 2014.
International Search Report and Written Opinion issued in PCT/IB2013/002633, dated Jun. 4, 2014.

* cited by examiner

Primary Examiner — Travis M Figg
(74) Attorney, Agent, or Firm — Norton Rose Fulbright US LLP

(57) ABSTRACT

Described is a thiol-ene composition that includes a resinous mixture of at least a first monomer and at least a second monomer, in which the first monomer is a polyfunctional allyl monomer and the second monomer is a polyfunctional thiol and the molar ratio of the first monomer to the second monomer is about 60:40 to about 80:20. Said composition further includes conductive colloidal particles in an amount between about 4 wt % and about 7 wt % of the total composition. When cured, a formed composition offers self-healing properties and resistance to abrasions and scratches that exceed the levels found in comparative thiol-enes that either lack the addition of the conductive colloidal particles and/or have a less effective ratio of first monomer to second monomer.

18 Claims, No Drawings

(56) References Cited

FOREIGN PATENT DOCUMENTS

WO  WO-2012105974 A1 * 8/2012 ............... C09D 4/00
WO  WO 2012/177239    12/2012 under 35 U.S.C. § 371 of International Application No. PCT/IB2013/002624 filed 3 Sep. 2013. The entire contents of the above-referenced disclosure is specifically incorporated herein by reference without disclaimer.

SELF-HEALING TRANSPARENT POLYMER COMPOSITIONS CONTAINING CONDUCTIVE COLLOIDS

PRIORITY

This application is a national phase application under 35 U.S.C. § 371 of International Application No. PCT/IB2013/002624 filed 3 Sep. 2013. The entire contents of the above-referenced disclosure is specifically incorporated herein by reference without disclaimer.

BACKGROUND

Described are transparent polymer compositions, said transparent polymer compositions contain conductive colloids, which, when prepared, are useful for applications requiring these transparent compositions, including optical applications. In particular, the transparent polymer compositions described herein include reparative or self-healing properties.

The development of polymer compositions that are not only transparent but offer protective properties is continually evolving, with advancements directed towards better abrasion resistance and/or resistance to scratches when used as or with an article, such as an optical article, including ophthalmic lenses manufactured from glass and/or plastic materials.

Newer polymer compositions, including those that serve as coatings, that not only prevent or minimize scratches and surface abrasions of the glass and/or plastic materials but include self-healing properties are also under development. While some self-healing compositions have been developed as top coats for the automotive industry, these compositions often only partially seal a portion of the composition that has been subjected to damage or scratches. In addition, many of the newer compositions, while showing some self-healing properties have an unacceptable initial haze level and are too easy to scratch.

There remains then an effort to improve upon these compositions, making them ever better, with improved abrasion and scratch resistance as well as improvements in toughness and self-healing properties.

SUMMARY

In one or more embodiments described herein is a first composition. The first composition may be molded and/or applied to a surface of an article. The first composition undergoes a coupling reaction to form a second transparent composition.

The first composition generally comprises a resinous mixture consisting essentially of a thiol-ene or polythiol-ene resinous mixture in combination with conductive colloidal particles. The thiol-ene or polythiol-ene resinous mixture will include at least a first monomer and a second monomer. The first and second monomers are present in a molar ratio of about 60:40 to about 80:20 (first monomer to second monomer). The conductive colloidal particles are generally added after the first and second monomer are blended, and are added in an amount between about 4 wt % and about 7 wt % of the solid content of the total first composition. The conductive colloidal particles consist of one or more of a metalloid oxide, metal oxide, or a mineral oxide, examples of which include antimony oxide ($Sb_2O_3$), tin dioxide ($SnO_2$), and phosphorus pentoxide ($P_2O_5$), respectively. The average particle size of the conductive colloidal particles is generally about 5 nm to about 25 nm. The conductive colloidal particles are typically dispersed in a diluent that is compatible with the resinous mixture, including but not limited to an organic solvent, such as a lower alkanol (e.g., methanol) or glycol alkyl ether. Often, a glycol-based solvent is preferred or a solvent that has a higher flash point and higher boiling point.

The first monomer is an -ene, comprising an allyl monomer with carbon-carbon double bonds and/or carbon-carbon triple bonds that in the described allyl monomer is a more rigid structure having a higher cross-linking density than some comparative allyl monomers. The first monomer is generally a polyfunctional allyl monomer, such as a triallyl monomer. Examples of suitable first monomers include a triallyl triazine, triallyl cyanurate, triallyl isocyanurate, triallyl ether, and variations thereof, in an amount greater than about 40 wt % and up to about 75 wt % of the resinous mixture. Generally, the first monomer is in an amount greater than about 45 wt % and up to about 70 wt % of the resinous mixture.

The second monomer is a thiol, generally consisting of one or more polyfunctional thiols. However, monofunctional thiols are also acceptable. Representative examples of a suitable thiol include a modified trithiol or a modified tetrathiol (e.g., mercaptan), including, but not limited to, pentaerythritol tetrakis-(3-mercaptopropionate), ethoxylated pentaerythritol tetrakis-(3-mercaptopropionate), trimethylpropane tri(3-mercapto-propionate), glycol 3-mercaptopropionate, poly propylene glycol 3-mercaptopropionate, ethoxylated trimethylpropane tri(3-mercapto-propionate), ethoxylated glycol dimercaptoacetate, trimethylolpropane trimercaptoacetate, glycol di-(3-mercaptopropionate), 1,4-bis (3-mercaptobutylyloxy) butane, pentaerithrytol tetrakis (3-mercaptobutylate), or 1,3,5-Tris(3-melcaptobutyloxethyl)-1,3,5-triazine-2,4,6(1H,3H,5H)-trione and variations thereof.

The first composition typically further comprises a solvent, taking advantage of solvents known to one of skill in the art. This solvent may be the same as or compatible with the diluent used for dispersion of the conductive colloidal particles. Up to 30 wt % of the first composition may comprise the solvent. The first composition may also comprise a photo reactive catalyst or initiator. However, no additional catalyst is required because the coupling reaction of the resinous mixture may be controlled by light.

The first composition, when prepared, forms a liquid in which the resinous mixture is generally at least about 70% of the composition based on the weight of the total composition.

In some embodiments, the first composition may be molded. In additional embodiments, the first composition may be applied as a liquid to a substrate, at a suitable thickness to form a thin film. The first composition may be applied to the entirety of the substrate or to only one facing surface of the substrate or to a portion thereof. In some embodiments, the first composition is applied to the substrate at a thickness of about 2 µm to about 50 µm. In some embodiments, the substrate is an optical element or article. However, the substrate need not be transparent.

The first composition is cured to form a second composition. Curing may be by one or more of heat and light, such as UV light. The second composition may be cured in a mold, thereby forming a shape memory polymer, or after application to a substrate, thereby forming at least one layer on a substrate.

The second transparent composition is a thiol-ene composition having a generally uniform network. The second composition will have a thiol-ene network formed by a thiol-ene coupling reaction between the polyfunctional allyl monomer and the polyfunctional thiol and will include the conductive colloidal particles dispersed generally rather uniformly therein. The second composition forms a transparent matrix that has a glass transition temperature from about 40° C. to about 100° C. After curing, the second composition may be further treated by heat. As described further herein, the second composition can be suitably cured in such as manner so as to remove the solvent or the majority of the solvent.

The second transparent composition, in some embodiments, is a shape memory material and may be used in a variety of applications. In some embodiments, the second transparent composition is a self-healing coating. In one or more embodiments, the second transparent composition is a coating or at least one outer layer of an article, such as an optical article. As a coating, the second transparent composition may be a single layer or be a plurality of layers, either directly on the surface of the article or on another material positioned between the second transparent composition and the article.

Described herein is also an optical article that includes a transparent substrate and at least the second composition. The second composition may be directly adjacent the transparent substrate or merely proximate to the transparent substrate, such that an intermediate layer is between at least a portion of the second composition and the transparent substrate. The second composition may include one or a plurality of layers, each layer applied independently.

The second composition will have properties that include toughness, anti-corrosion, resistance to abrasion and self-healing and when applied as a coating to an article, such as an optical article, will provide these properties to the surface of the article to which is it applied.

DESCRIPTION

Although making and using various embodiments are discussed in detail below, it should be appreciated that as described herein are provided many inventive concepts that may be embodied in a wide variety of contexts. Embodiments discussed herein are merely representative and do not limit the scope of the invention.

Described herein are thiol-ene compositions that are transparent and have a shape memory (capability of returning to an initial shape from a temporary or deformed shape). These described thiol-ene compositions are improvements from earlier developed thiol-ene materials, such as those from Norland Products Inc. (under the name of Norland optical adhesives), and show superior healing as well as abrasion resistance. The described compositions are also superior to polystyrene or epoxy-based polymer compositions from Cornerstone Research Group, Inc. (under the name of Veriflex® and Veriflex® E, respectively, each registered to Cornerstone Research Group, Inc., Ohio, USA), which show good healing performance but high initial haze level and poor scratch resistance.

The thiol-ene compositions described herein incorporate conductive colloidal particles into the resinous mixture before curing. Said conductive colloidal particles are generally homogeneous or uniformly distributed and form a clear and stable suspension in the resinous mixture and are distinguishable from non-conductive particles, such as silica, that may improve the healing performances of the final composition but were not found to provide any improvement in resistance to abrasions or scratches and were found to give a higher haze value to the final composition. Examples of conductive colloidal particles include, but are not limited to, $Sb_2O_3$, $SnO_2$, $P_2O_5$ and various combinations thereof. The conductive colloidal particles are generally in an amount between about 3 wt % and about 8 wt % of the total dry composition or between about 4 wt % and about 7 wt % of the total dry composition. Their average particle size is generally about 5 nm to about 25 nm and is initially dispersed in a diluent (e.g., organic solvent) compatible with the resinous mixture. Examples of a suitable diluent include, but are not limited to, a lower alkanol (e.g., methanol) and a glycol alkyl ether. Preferred solvents are those with a higher flash point and a higher boiling point.

The thiol-ene compositions are prepared by increasing the molar amount of the -ene monomer and thereby decreasing the molar amount of the thiol. Thus, as described herein the molar ratio of the -ene monomer to the thiol monomer shifts from a 50:50 ratio (in other known thiol-ene compositions) to a ratio that is in a range of between about 60:40 and about 80:20 (-ene monomer to thiol monomer). The -ene monomer is, thus, typically in an amount between about 60 wt % and about 70 wt % of the resinous mixture that forms the thiol-ene compositions. Accordingly, an -ene monomer described herein is one that has a more fully modified backbone. Preferably, the -ene monomer is a polyfunctional allyl monomer, such as a triallyl monomer, including, but not limited to, one or more of a triallyl triazine, triallyl cyanurate, triallyl isocyanurate, triallyl ether, and variations thereof. Several representative -ene monomers include 1,3,5-triallyl-1,3,5-triazine-2,4,6(1H,3H,5H)-trione; and 2,4,6-triallyloxy-1,3,5-triazine or triallyl cyanurate, respectively. Another exemplary embodiment of a monomer is 1,2,4-trivinylcyclohexane (a mixture of isomers).

The thiol is either a polyfunctional thiol or a monofunctional thiol. Examples of suitable polyfunctional thiols include, but are not limited to, a modified trithiol or a modified tetrathiol, such as pentaerythritol tetrakis-(3-mercaptopropionate), ethoxylated pentaerythritol tetrakis-(3-mercaptopropionate), trimethylpropane tri(3-mercapto-propionate), glycol 3-mercaptopropionate, poly propylene glycol 3-mercaptopropionate, ethoxylated trimethylpropane tri(3-mercapto-propionate), ethoxylated glycol dimercaptoacetate, trimethylolpropane trimercaptoacetate, glycol di-(3-mercaptopropionate), 1,4-bis (3-mercaptobutylyloxy) butane, pentaerithrytol tetrakis (3-mercaptobutylate), or 1,3,5-Tris(3-melcaptobutyloxethyl)-1,3,5-triazine-2,4,6(1H,3H,5H)-trione and variations thereof. A representative thiol is pentaerythritol tetrakis(3-mercapto propionate).

In one or more embodiments, the thiol and -ene monomer are combined in a resinous mixture. Together the thiol and -ene monomer comprise at least 70% by weight of the resinous mixture or at least 80% by weight of the resinous mixture, or at least 90% by weight of the resinous mixture. The resinous mixture will include essentially the at least one thiol and the at least one polyfunctional allyl monomer, with or without a reactant or catalyst. Said catalyst is not essential because the liquid resinous mixture is reactive to light. When desired, a photo-reactive catalyst is included in the resinous mixture. The photo-reactive catalyst may be one that reacts under UV light. Examples of photo-reactive catalysts are those under the name of Irgacure® (registered to Ciba Specialty Chemicals Corporation, New York, USA). The resinous mixture may also include a wetting agent (surfactant), preferably in an amount that is not greater than about 0.5% by weight of the total coating composition or not greater than about 0.2% by weight of the total coating composition. An example of a wetting agent is a fluorocarbon-modified polysiloxane, such as those in the name of EFKA® (registered to Ciba Corporation, New York, USA).

The conductive colloidal particles are dispersed homogeneously or substantially homogeneously in the thiol-ene network formed from a cross-linking and coupling reaction between the at least one polyfunctional allyl monomer, which is more rigid and generally has a higher crosslinking density, and the at least one thiol. The cured thiol-ene matrix will have a glass transition temperature from about 40° C. to about 100° C., preferably in the range of from about 45° C. to about 95° C. This is contrasted with earlier developed thiol-ene materials, such as those from Norland Products Inc., that have lower glass transition temperatures and are thus heated at a healing temperature of about 60° C. and generally no less than about 70° C., whereas the thiol-ene compositions described herein may be healed at a healing temperature that is higher, such as about 75° C., or about 80° C., or about 85° C., or about 90° C. or about 95° C. or about 100° C.

The described thiol-ene compositions may be molded prior to curing. Said molding may including placing in a pre-formed mold prior to curing or applying said thiol-ene composition to a substrate prior to curing, such that when applied or placed in a pre-formed mold, the thiol-ene composition is not yet fully cured and is therefore capable of being shaped. When applying the thiol-ene composition, any suitable means may be used. Examples include, but are not limited to, pouring, dipping (e.g., dip-coating), bar coating, spray coating, and spin coating.

The thiol-ene composition may then be cured after molding or shaping to form a cured, shaped article. Curing may include one or more drying steps. For example, in some embodiments, after shaping or molding, the thiol-ene composition may be thermally cured by drying at room temperature or at an elevated temperature, generally not greater than 120° C. or in a range from about 30° C. to about 120° C. The drying is useful to evaporate solvent that may be included as a component to improve viscosity of the resin composition. Suitable solvents include a glycol ether, tetrahydrofuran (THF), and chloroform. Preferred solvents are those that evaporate quickly and have high water solubility. Curing may also be with light, especially by UV irradiation. Suitable but not exclusive radiation doses are from about 0.150 J/cm$^2$ to about 1.20 J/cm$^2$. Suitable, but not exclusive, UV wavelengths are from about 100 nm to about 250 nm (e.g., UV-C).

In one or more embodiments, the shaped article is a thin film, which when applied to a substrate, may be referred to as a coating. When the thiol-ene composition is used as a coating or as a thin film, it will have a thickness in accordance with thin films. In some embodiments, the thickness will be less than 100 or it may be at or about 2 µm to about 50 or from about 5 µm to about 20 µm. Of course, other thicknesses may be appropriate and/or desired. There is no particular limitation in the thickness of the thiol-ene compositions described herein.

Substrates to which a thiol-ene composition may be applied include an organic glass or a plastic material, such as a thermoplastic resin (e.g., thermoplastic polycarbonate), or a thermoset or photo-cured resin (e.g., glycol carbonate; including CR-39®, which is registered to PPG Industries Ohio, Inc. Delaware, USA; polyurethane; and polythiourethane). In addition, other substrates are acceptable, such as metal, wood, and composites. When the substrate is optic in nature, it will generally be transparent or transparent at certain wavelengths. The substrate will have a surface to which the thiol-ene composition is applied. The thiol-ene composition may be applied to the outermost surface of the substrate or a layer (surface) that is between the thiol-ene composition and the substrate.

When a thiol-ene composition is provided on the surface of an optical article, the optical article may be a lens or an ophthalmic lens, such as a contact lens, sunglass lens or other optical lens. The lens may include additional functional layers on its outer surface, such as one or more polarizing layers, anti-reflective coating layers, visible light and UV absorbing layers, anti-choc layers, photochromic coating layers, and various combinations thereof. Thus, the thiol-ene composition may be applied directly to the surface of the lens or to its exterior coating or layer surface.

The resinous mixture and the cured thiol-ene composition are each essentially free of components that are not part of the thiol-ene network or the colloidal particles. Thus, with the exception of minor amounts of additives (e.g., wetting agent, slip agent and catalyst or initiator) that assist in curing or matrix formation, the final thiol-ene network will not have non-colloidal mineral fillers, organic fillers, fibers, and the like. Moreover, because the thiol-ene is suitably cured in such as manner so as to remove the solvent or the majority of the solvent, there should be minimal solvent in the final thiol-ene composition after curing.

Optionally, thiol-ene compositions described herein may include one or more oligomers or polymer components, said components being either covalently bound to the thiol-ene network or incorporated therein in a rather ordered or homogeneous manner. Any such component will be compatible with the monomers that make up the thiol-ene composition (i.e., polyfunctional allyl monomer and thiol), thereby preventing phase separation during or after curing. This is because a phase separation will lead to excessive haze of the final thiol-ene composition when cured. When included, an additional oligomer or polymer component will be less than 30% by weight of the final composition or not higher than 20% by weight of the final composition, or not higher than 10% by weight of the final composition.

For assessing performance of the thiol-ene compositions described herein, self-healing and abrasion resistance were measured using the ISTM Bayer test and the Automated Steel Wool (ASW) test.

The ISTM Bayer test is used to evaluate the level of abrasion resistance of a surface or a coated surface by abrading a convex shaped surface or coated surface of a plano lens by exposing it to an abrasive material (e.g., Alundum®, which is registered to Saint Gobain Abrasive, Inc., Massachusetts, USA) in a shaker tray for 600 cycles by reciprocated back and forth motion, similar to ASTM F735-81. The haze levels before and after abrasion are measured using a Haze Guard XL-21 1 Plus meter. The change in haze of an uncoated lens (CR-39®, which is registered to PPG Industries Ohio, Inc., Ohio, USA) and a coated lens (using the same lens) are recorded and a ratio of the uncoated lens haze to the coated lens haze provides a performance level to which further examples described herein are compared with. At least three test lenses are evaluated, and their value averaged to identify the ratio. A higher ratio means the coating has a better abrasion resistance.

The ASW test measures an initial haze (Haze$_0$) using a Hazegard XL-211 Plus meter. The convex side of a plano lens is then rubbed with steel wool (000 grade) for five cycles (one cycle=one forward stroke and one backward stroke) under 1200 g of load using an automated steel wool machine. The haze of the scratched lens is then measured under the same conditions to give Haze$_s$. Generally scratches are in a range from 0 to 3 µm in depth. The lens is then immersed in warm water (approximately 85-90° C.) for 15 minutes, removed from the water, cleaned with distilled water, and air blown to dry. The haze after immersion and drying ($Haze_n$), which reflects the healing process of the thiol-ene composition, is measured by the Haze Guard XL-211 Plus meter. A healing performance or healing level is calculated using equation (1):

$$\text{Healing level (\%)} = \frac{Haze_s - Haze_{hw}}{Haze_s} \times 100 \ (\%). \quad (1)$$

In the ASW Test, the haze values of a scratched lens ($Haze_s$) may also indicate a scratch resistance level of a coating applied on the lens, such that the higher haze exhibited by the lens, the lower the scratch resistance by the coating process.

In a first example, thiolene compositions (A1 to A5) without colloidal particles were compared with other compositions that also did not have conductive colloids but had different molar composition of -ene to thiol. The general compositions for each 100 g solution are presented in TABLE 1, in which only the molar content of the -ene monomer are shown. Compositions A1 to A5 have ratios of -ene:thiol as described herein. A comparative reference coating (R), prepared similar to a product known as NOA61, from Norland Products Inc., consists essentially of the -ene monomer, 1,3,5-triallyl-1,3,5-triazine-2,4,6(1H,3H,5H)-trione, in a molar percentage of about 55% and the thiol, pentaerythritol tetrakis(3-mercapto propionate), in molar percentage of about 45%. Thus, in this comparative reference, the ratio of -ene:thiol is 55:45. In other comparative compositions C1, C2 as well as the described compositions, A1 to A5, the -ene monomer was also 1,3,5-triallyl-1,3,5-triazine-2,4,6(1H3H,5H)-trione (TTT) and the thiol was pentaerythritol tetrakis(3-mercapto propionate) (PTMP). In all the formulations (solution compositions) in TABLE 1, the -ene monomer and thiol were blended with a solvent (Dowanol® PM, registered to Dow Chemical Company, Michigan, USA). In A4 and A5, an optional photo reactive catalyst (Irgacure® 184) was included.

TABLE 1

| Solution | PTMP (g) | TTT (g) | solvent (g) | catalyst (g) | -ene (molar %) |
|---|---|---|---|---|---|
| C1 | 37.2 | 22.8 | 40.0 | 0 | 47 |
| C2 | 34.8 | 25.2 | 40.0 | 0 | 52 |
| R | 33.0 | 27.0 | 40.0 | 0 | 55 |
| A1 | 30.0 | 30.0 | 40.0 | 0 | 60 |
| A2 | 26.4 | 33.6 | 40.0 | 0 | 65 |
| A3 | 24.0 | 36.0 | 40.0 | 0 | 69 |
| A4 | 21.0 | 39.0 | 39.4 | 0.6 | 73 |
| A5 | 18.0 | 42.0 | 39.4 | 0.6 | 77 |

The above formulations were subsequently applied prior to curing to a substrate that was a plastic ophthalmic lens, uncoated lens (CR-39®). The application included spin coating each thiol-ene resin formulation onto an outer surface of the lens substrate at a speed of 400 rpm (10 s) to 800 rpm (6 s). Once applied, each formulation was cured by placing the lens on a running belt of a UV fusion machine, two times, each time at a speed of 1.8 meter/minutes, followed by thermal treatment in an oven at 100° C. for 30 minutes for complete curing and removal of the solvent. A final thickness of each cured thiol-ene resin coating composition was between 5 μm and 7 μm.

TABLE 2 provides the haze values, healing levels and ISTM Bayer values for each thiol-ene resin coating composition after application and curing on the lens as described above. Improvements in abrasion resistance (corresponding to ISTM Bayer results) for A1-A5 coating compositions were found as compared with R, C1 and C2, each of which had a molar amount of thiol-ene that differed from what is described herein. The $Haze_s$ values of A1 to A5 decreased significantly as compared with R, C1 and C2, showing improvements in the described coating compositions in terms of scratch resistance, that was similar to the abrasion resistance performance (to ISTM Bayer results). Healing levels (%) of A1 to A5 were only modestly improved or essentially the same in A1 and A2, and were worse when the molar ratio of -ene to thiol (difference therebetween) was too high (see A3-A5).

TABLE 2

| Coating | $Haze_0$ (%) | $Haze_s$ (%) | $Haze_{hw}$ (%) | Healing (%) | ISTM Bayer |
|---|---|---|---|---|---|
| C1 | 0.15 | 7.91 | 3.12 | 61 | 0.50 |
| C2 | 0.12 | 4.70 | 2.20 | 53 | 0.55 |
| R | 0.14 | 3.73 | 2.03 | 46 | 0.62 |
| A1 | 0.30 | 3.21 | 1.94 | 40 | 0.78 |
| A2 | 0.28 | 1.97 | 1.00 | 49 | 0.92 |
| A3 | 0.24 | 1.59 | 1.05 | 34 | 1.06 |
| A4 | 0.10 | 1.65 | 1.11 | 33 | 1.26 |
| A5 | 0.09 | 1.49 | 1.09 | 27 | 1.35 |

It was found that with introduction of conductive colloidal particles to a thiol-ene composition having a molar amount of the -ene monomer that was at least 60% or greater, such as 60%, or about 65% or about 69% or about 73% or about 77%, there was an improved healing performance of the thiol-ene composition to a level that was, in fact, superior to what was found in the thiol-ene compositions having the lower molar amounts of the -ene monomer or less than 60%, such as 55% or less. These results are shown in TABLE 4.

To each of the thiol-ene resin formulations A2 to A5 (see also TABLE 1), conductive colloidal particles were introduced prior to curing in order to prepare formulations B1 to B4, respectively. The amount of the conductive colloidal particles added in each formulation was the same, at 5 wt % of the total solid content. These formulations are depicted generally in TABLE 3. The conductive colloidal particles were mineral colloidal particles of $Sb_2O_3$ (ELCOM NE 1002SBV from JGC Corporation).

TABLE 3

| Thiol-ene solution (g) | SBV colloidal solution (g) | Final solution |
|---|---|---|
| A2 42.9 | 7.1 | B1 |
| A3 42.9 | 7.1 | B2 |
| A4 42.9 | 7.1 | B3 |
| A5 42.9 | 7.1 | B4 |

Each of B1 to B4 was then applied in solution to a plastic ophthalmic uncoated CR-39® lens. Each application included spin coating the thiol-ene formulation (B1, B2, B3 or B4) at a speed of 400 rpm (10 s) to 800 rpm (6 s) onto the lens. Once applied, the coated lens was placed onto a running belt of a UV fusion machine to cure the composition, two times, each time at a speed of 1.8 meter/minute, followed by thermal treatment in an oven at 100° C. for 30 minutes for complete curing and to remove essentially all solvents in the formulation. The final thickness of each thiol-ene coating composition when cured was between 5 µm and 7 µm.

TABLE 4 shows significant improvement in scratch and abrasion resistance of a coated lens containing any one of B2 to B4 coating compositions. These values are compared with R, which has a general molar ratio of about 55:45 for -ene to thiol. For example, B2 and B3 show improvements in scratch resistance (<1.6% $Haze_s$, as compared with R), and abrasion resistance (>two times ISTM Bayer, as compared with R). TABLE 4 also shows an improvement in the healing level of the coated lenses containing any one of B2 to B4 coating compositions. The healing levels were greater than 65%, resulting in the lowest final haze on the lens (<0.4% $Haze_{hw}$) as compared with R.

TABLE 4

| Coating | $Haze_0$ (%) | $Haze_s$ (%) | $Haze_{hw}$ (%) | Healing (%) | ISTM Bayer |
|---|---|---|---|---|---|
| R | 0.14 | 3.73 | 2.03 | 46 | 0.62 |
| B1 | 0.13 | 2.20 | 0.72 | 68 | 1.12 |
| B2 | 0.15 | 1.47 | 0.34 | 77 | 1.28 |
| B3 | 0.18 | 1.13 | 0.39 | 66 | 1.51 |
| B4 | 0.16 | 0.93 | 0.47 | 50 | 1.62 |

In TABLE 5, the thiol-ene formulations A2 to A5 (see TABLE 1) were blended with conductive colloidal particles of the same type but in different amounts, at 5.7 wt % of the total solid content for A4 and A5 and 6.3 wt % of the total solid content for A2 and A3. These blends were prepared as described previously for B1 to B4 and after blending formed formulations B5 to B8, as depicted below.

TABLE 5

| Thiol-ene solution (g) | SBV colloidal solution (g) | Final solution |
|---|---|---|
| A2 | 41.5 | 8.5 | B5 |
| A3 | 41.5 | 8.5 | B6 |
| A4 | 42.0 | 8.0 | B7 |
| A5 | 42.0 | 8.0 | B8 |

Formulations B5 to B8 were each applied to a plastic ophthalmic uncoated CR-39® lens followed by curing, as described above for B1 to B5. The final thickness of B5 to B8 when cured was between 5 µm and 7 µm.

TABLE 6 shows the haze values, healing properties and abrasion resistance of compositions B5 to B8 after being applied as coating compositions on the lens substrate. Similar to the results found in TABLE 4, TABLE 6 shows that the addition of the conductive colloidal particles to the thiol-ene formulations prior to curing resulted in improved final coating compositions when cured, including improvements in healing level, final haze and scratch resistance. Even better improvements in healing level were observed in B5 and B6, which were better than R, yet having a lower -ene monomer content. The healing properties of B7 and B8, in which the amount of the conductive colloidal particles in the thiol-ene network was increased, remained better than R, but less than B5 and B6. This may suggest that having conductive colloidal particles much greater than about 10 wt % or greater than about 8 wt % or greater than about 7 wt % will not offer significant improvements in the formulations described herein.

TABLE 6

| Coating | $Haze_0$ (%) | $Haze_s$ (%) | $Haze_{hw}$ (%) | Healing (%) | ISTM Bayer |
|---|---|---|---|---|---|
| R | 0.14 | 3.73 | 2.03 | 46 | 0.62 |
| B5 | 0.19 | 1.91 | 0.58 | 70 | 1.20 |
| B6 | 0.21 | 1.56 | 0.44 | 72 | 1.25 |
| B7 | 0.13 | 1.35 | 0.55 | 59 | 1.44 |
| B8 | 0.19 | 1.22 | 0.63 | 48 | 1.50 |

In view of TABLES 1 to 6, it appears that adding a defined amount of conductive colloidal particles (e.g., 3-10 wt % or 4-8 wt % or 5-7 wt %) to a thiol-ene resin formulation, such as as described herein, improves healing performance when formed as a coating composition on a substrate. This was found when the -ene monomer was in a molar amount greater than about 55%, which is contrary to what would have been expected, given the relationship observed when the ratio of the -ene monomer to thiol is shifted from a more equimolar ratio.

Thus, modified thiol-ene coating compositions having a higher molar content of the -ene monomer (as compared with the thiol), as well as a defined amount of conductive colloidal particles, offer improvements in resistance to abrasion and scratching as well as an improvement in healing performance.

While the previous examples show a thiol-ene composition prepared with an -ene monomer that was a triallyl monomer, other similar monomers may also be used. For example, as depicted in TABLES 7-9, another exemplary polyfunctional allyl monomer, 2,4,6-triallyloxy-1,3,5-triazine (TAC), was the -ene monomer used to form thiol-ene formulations and final compositions as described herein. Improvements in scratch resistance and healing were also observed when the final compositions (provided as coating compositions to a lens substrate) included TAC.

TABLE 7 shows the thiol-ene formulations D1 to D4, in which the -ene monomer was TAC and the thiol was PTMP. The solvent was Dowanol® PM. D1 to D4 lacked the addition of conduction colloidal particles.

TABLE 7

| Solution | PTMP (g) | TAC (g) | solvent (g) | TAC (molar %) |
|---|---|---|---|---|
| D1 | 37.2 | 22.8 | 40.0 | 47 |
| D2 | 33.0 | 27.0 | 40.0 | 55 |
| D3 | 26.4 | 33.6 | 40.0 | 65 |
| D4 | 24.0 | 36.0 | 40.0 | 69 |

Formulations D1 to D4 were each applied to plastic lens substrates as described previously and in the same manner. The abrasion resistance and healing values that were obtained with TAC (TABLE 8) were similar to what was found in the previous tables in which the thiol was TTT.

TABLE 8

| Coating | $Haze_0$ (%) | $Haze_s$ (%) | $Haze_{hw}$ (%) | Healing (%) | TAC (molar %) |
|---|---|---|---|---|---|
| D1 | 0.13 | 6.41 | 2.07 | 68 | 47 |
| D2 | 0.18 | 2.97 | 1.34 | 55 | 55 |
| D3 | 0.13 | 2.71 | 1.22 | 55 | 65 |
| D4 | 0.14 | 0.81 | 0.70 | 14 | 69 |

Some comparative values when TTT is used as the thiol monomer in the formulation and thereafter applied as a coating composition are shown in TABLE 9, which compares C1, R, A2 and A3, all of which, like D1 to D4, were not blended with conduction colloidal particles after preparing the thiol-ene formulations.

TABLE 9

| Coating | $Haze_{hw}$ (%) | Healing (%) | TTT (molar %) |
|---------|-----------------|-------------|---------------|
| C1      | 3.12            | 61          | 47            |
| R       | 2.03            | 46          | 55            |
| A2      | 1.00            | 49          | 65            |
| A3      | 1.05            | 34          | 69            |

With addition of conductive colloidal particles to each of formulations D3 and D4, final formulations D5 and D6 were prepared, as depicted in TABLE 10. In each of D5 and D6, the amount of the conductive colloidal particles was the same, at 5 wt % (solid content), and were the same type, $Sb_2O_3$.

TABLE 10

| Thiol-ene solution (g) | SBV colloidal solution (g) | Final solution |
|------------------------|----------------------------|----------------|
| D3  17.2               | 2.8                        | D5             |
| D4  17.2               | 2.8                        | D6             |

The final formulations D5 and D6 were evaluated as coating compositions after each was spin coated onto an uncoated CR-39® lens in the manner previously described for B1 to B4. Values obtained after testing are depicted in TABLE 11, as compared with previous values for R.

TABLE 11

| Coating | $Haze_0$ (%) | $Haze_s$ (%) | $Haze_{hw}$ (%) | Healing (%) |
|---------|--------------|--------------|------------------|-------------|
| R       | 0.14         | 3.73         | 2.03             | 46          |
| D5      | 0.20         | 2.25         | 0.79             | 65          |
| D6      | 0.19         | 0.56         | 0.29             | 49          |

Each of D5 and D6 showed improvements in both scratch resistance and healing. The values were, in fact, similar to those obtained with compositions B1 and B2.

When the -ene monomer was not a polyfunctional allyl monomer, such as a trivinylcyclohexane, the resinous mixture, when prepared, underwent some phase separation. This was exemplified in a mixture that combined 18.0 g of thiol monomer (PTMP) with 12.0 g of the trivinylcyclohexane (thus, providing a molar content of 69%), which was blended with 19.8 g of solvent, Dowanol® PM, and 0.3 g of a catalyst, Irgacure® 184. This alternative resin, when applied after curing onto an uncoated CR-39® plastic lens, in the same manner described previously and subsequently evaluated as previously described, was found to be hazy (data not shown).

Methods of manufacturing said thiol-ene formulations that exhibit the improved properties described herein include preparing a resinous mixture by blending at least one polyfunctional allyl monomer and at least one polyfunctional thiol in a molar ratio of about 60:40 to about 80:20, optionally including a different oligomer or polymer that is compatible therewith, and homogeneously dispersing into this resinous mixture conductive colloidal particles in an amount between about 4 wt % to about 8 wt % or in an amount between about 5 wt % and about 7% based on the total solid content of the resinous mixture. The conductive colloidal particles may initially be dispersed in an organic solvent. In addition, a wetting agent may also be added to the mixture prior to curing (preferably before addition of the conductive colloidal particles), preferably in an amount of about or less than 0.2% by weight of the total composition. Optionally, a photo-reactive catalyst is added to the mixture prior to curing (preferably before addition of the conductive colloidal particles), but is not required. Up to 30 wt % of the blended resinous mixture containing the conductive colloidal particles may comprise a solvent. When blended, the resinous mixture is capable of forming a shape memory composition after curing. Prior to curing, the resinous mixture may be poured in a mold or applied to a substrate. When applied to a substrate, in some embodiments, the resinous mixture is applied in solution as a thin layer or as a coating layer. Curing, which includes curing of the thin layer or coating layers, typically includes UV light with or without heat. The heating may be at a temperature between about 30° C. and about 120° C. When coating a substrate, such as an optical substrate, the coating will be a very thin coating offering healing properties and abrasion resistance to the substrate to which it is coating. Optionally, the final composition or coating, such as one having scratches and/or abrasions, may be subjected to a healing step that includes heating the substrate with a cured thiol-ene composition thereon at a temperature at least equal to the glass transition temperature of the thiol-ene formulation. Healing may be through heating by conduction or convection. The heating medium may be a suitably heated gas at least equal to the glass transition temperature of the thiol-ene formulation, preferably air. In some embodiments, healing is carried out by contacting the outermost surface of the described thiol-ene composition with a liquid as the temperature at least equal to the glass transition temperature of the thiol-ene formulation, preferably water. This healing may be maintained for a duration that is from about 1 minute to about 60 minutes, often from about 10 minutes to about 30 minutes.

Overall, the thiol-ene compositions described herein provide improvements by offering self healing properties and improvements in their resistance to scratches or abrasions.

Although representative processes and articles have been described in detail herein, those skilled in the art will recognize that various substitutions and modifications may be made without departing from the scope of what is described and defined by the appended claims.

What is claimed is:

1. A composition comprising:
   a thiol-ene network formed by a thiol-ene reaction with at least a first monomer and at least a second monomer in a resinous mixture, wherein the first monomer is a polyfunctional allyl monomer and the second monomer is a polyfunctional thiol, wherein a molar ratio of the first monomer to the second monomer in the resinous mixture is about 65:35 to about 73:27; and
   conductive colloidal particles in an amount between about 5 wt % and about 7 wt % of the thiol-ene network, wherein the conductive colloidal particles are dispersed uniformly within the thiol-ene network, forming a transparent matrix that has a glass transition temperature from about 40° C. to about 100° C.;
   wherein the composition is a thin transparent film coating on an ophthalmic lens having a thickness in a range from about 2 μm to about 50 μm; and
   wherein the conductive colloidal particles are selected from the group consisting of $Sb_2O_3$, $P_2O_5$, and a combination thereof.

2. The composition of claim 1, wherein the composition is a shape memory composition.

3. The composition of claim 1, wherein the molar ratio of the first monomer to the second monomer in the resinous mixture is about 69:31 to about 73:27.

4. The composition of claim 1, wherein the polyfunctional allyl monomer is 1,3,5-triallyl-1,3,5-triazine-2,4,6(1H,3H,5H)-trione (TTT) and the polyfunctional thiol is pentaerythritol tetrakis(3-mercapto propionate) (PTMP).

5. An optical article comprising:
a transparent substrate; and
at least one transparent composition on a facing surface of the transparent substrate, wherein the transparent composition is formed by curing a resinous mixture comprising at least a polyfunctional allyl monomer and a polyfunctional thiol together with conductive colloidal particles in an amount between about 5 wt % and about 7 wt % of the transparent composition in which a molar ratio of the polyfunctional allyl monomer to the polyfunctional thiol is about 65:35 to about 73:27, and wherein the at least one transparent composition has a thickness in a range from about 2 µm to about 50 µm, is self-healing by at least partially or completely sealing its outer surface when subject to abrasion, and wherein the at least one transparent composition has a healing level of greater than 65% and a $Haze_{hm}$ of <0.58%; and
wherein the conductive colloidal particles are selected from the group consisting of $Sb_2O_3$, $P_2O_5$, and a combination thereof.

6. The optical article of claim 5, wherein the polyfunctional allyl monomer is a triallyl monomer comprising one or more of triallyl triazine, triallyl cyanurate, triallyl isocyanurate, triallyl ether, and variations thereof.

7. The optical article of claim 5, wherein the amount of the first monomer is about 40 wt % to about 75 wt % of the resinous mixture.

8. The optical article of claim 5, wherein the polyfunctional thiol is one or more of a modified trithiol, modified tetrathiol and variations thereof.

9. The optical article of claim 5, wherein the polyfunctional allyl monomer is a triallyl monomer comprising one or more of triallyl, wherein the resinous mixture is at least about 70% or greater of the composition based on the weight of the total composition.

10. The optical article of claim 5, wherein the polyfunctional allyl monomer is a triallyl monomer comprising one or more of triallyl, wherein the composition further comprises a solvent in an amount up to about 30% of the composition based on the weight of the composition.

11. The optical article of claim 5, wherein the polyfunctional allyl monomer is a triallyl monomer comprising one or more of triallyl, wherein the composition is applied in a liquid form to a substrate.

12. The optical article of claim 5, wherein the polyfunctional allyl monomer is a triallyl monomer comprising one or more of triallyl, wherein the composition is cured by one or more of heat and light.

13. The optical article of claim 5, wherein the molar ratio of the first monomer to the second monomer in the resinous mixture is about 69:31 to about 73:27.

14. The optical article of claim 5, wherein the polyfunctional allyl monomer is 1,3,5-triallyl-1,3,5-triazine-2,4,6 (1H,3H,5H)-trione (TTT) and the polyfunctional thiol is pentaerythritol tetrakis(3-mercapto propionate) (PTMP).

15. The optical article of claim 5, wherein the at least one transparent composition has a $Haze_{hw}$ of <0.4%.

16. An optical article comprising:
a transparent substrate; and
at least one transparent composition on a facing surface of the transparent substrate, wherein:
the transparent composition is formed by curing a resinous mixture comprising at least a polyfunctional allyl monomer and a polyfunctional thiol together with conductive colloidal particles selected from the group consisting of $Sb_2O_3$, $P_2O_5$, and a combination thereof, in an amount between about 5 wt % and about 7 wt % of the transparent composition in which a molar ratio of the polyfunctional allyl monomer to the polyfunctional thiol is about 65:35 to about 73:27;
the at least one transparent composition has a thickness in a range from about 2 µm to about 50 µm, is self-healing by at least partially or completely sealing its outer surface when subject to abrasion, and wherein the at least one transparent composition has a healing level of greater than 65% and a Hazehw of <0.58%; and
the polyfunctional allyl monomer is 1,3,5-triallyl-1,3,5-triazine-2,4,6(1H,3H,5H)-trione (TTT) and the polyfunctional thiol is pentaerythritol tetrakis(3-mercapto propionate) (PTMP).

17. The optical article of claim 16, wherein the molar ratio of the first monomer to the second monomer in the resinous mixture is about 69:31 to about 73:27.

18. The optical article of claim 16, wherein the at least one transparent composition has a $Haze_{hw}$ of <0.4%.

* * * * *

UNITED STATES PATENT AND TRADEMARK OFFICE
CERTIFICATE OF CORRECTION

PATENT NO. : 10,822,504 B2
APPLICATION NO. : 14/915840
DATED : November 3, 2020
INVENTOR(S) : Haipeng Zheng It is certified that error appears in the above-identified patent and that said Letters Patent is hereby corrected as shown below:

In the Claims

Claim 5, Column 13, Line 26:
Delete "a $Haze_{hm}$, of" and replace with -- a $Haze_{hm}$ of --.

Signed and Sealed this
Twenty-ninth Day of December, 2020

Andrei Iancu
*Director of the United States Patent and Trademark Office*